(12) United States Patent
Marumoto

(10) Patent No.: US 8,977,158 B2
(45) Date of Patent: Mar. 10, 2015

(54) ELECTRICAL CONNECTING MECHANISM, IMAGE FORMING APPARATUS AND OPTIONAL DEVICE

(75) Inventor: Takeshi Marumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 537 days.

(21) Appl. No.: 13/073,093

(22) Filed: Mar. 28, 2011

(65) Prior Publication Data

US 2011/0243577 A1   Oct. 6, 2011

(30) Foreign Application Priority Data

Mar. 31, 2010  (JP) .................................. 2010-081621

(51) Int. Cl.

| | | |
|---|---|---|
| G03G 15/00 | (2006.01) | |
| H01R 13/62 | (2006.01) | |
| H04N 1/00 | (2006.01) | |
| B65H 3/44 | (2006.01) | |
| G03G 21/18 | (2006.01) | |
| G03G 21/16 | (2006.01) | |

(52) U.S. Cl.
CPC .............. *H04N 1/0083* (2013.01); *B65H 3/44* (2013.01); *G03G 15/5004* (2013.01); *G03G 21/1867* (2013.01); *H04N 1/00885* (2013.01); *H04N 1/00899* (2013.01); *H04N 1/00904* (2013.01); *H04N 1/00907* (2013.01); *G03G 21/1652* (2013.01); *B65H 2402/10* (2013.01); *B65H 2402/62* (2013.01); *B65H 2405/332* (2013.01); *B65H 2801/06* (2013.01); *G03G 2221/166* (2013.01)
USPC .................... 399/90; 399/2; 439/296

(58) Field of Classification Search
USPC ............................ 399/2, 13, 90, 107; 439/296
See application file for complete search history.

(56) References Cited

U.S. PATENT DOCUMENTS

| | | | | |
|---|---|---|---|---|
| 4,621,272 A | * | 11/1986 | Toriumi et al. | ................ 346/134 |
| 5,270,772 A | * | 12/1993 | Akiyama | ....................... 399/110 |
| 5,666,595 A | * | 9/1997 | Sameshima et al. | .......... 399/110 |
| 5,940,116 A | * | 8/1999 | Park et al. | ..................... 347/263 |
| 2007/0070387 A1 | | 3/2007 | Kim | |

FOREIGN PATENT DOCUMENTS

| | | | | |
|---|---|---|---|---|
| CN | 1972354 | | 5/2007 | |
| JP | 07-295319 | | 11/1995 | |
| JP | 2007-148255 A | * | 6/2007 | ............ G03G 15/00 |
| JP | 2007148255 | | 6/2007 | |

OTHER PUBLICATIONS

Notice of Reasons for Rejection issued to JP Application No. 2010-081621, mailed May 23, 2012.
Office Action mailed Apr. 18, 2013 in Chinese Patent Application No. 201110068562.6.

* cited by examiner

*Primary Examiner* — Clayton E Laballe
*Assistant Examiner* — Jas Sanghera
(74) *Attorney, Agent, or Firm* — Dilworth & Barrese, LLP.

(57) ABSTRACT

An electrical connecting mechanism includes: a first connector disposed at an apparatus main body; a second connector disposed at an optional device, a power feed switch disposed at one among the apparatus main body and the optional device and capable of switching between a connected state and an unconnected state; and an operation element that is disposed in the other one among the apparatus main body and the optional device, and causes a state in which power can be supplied from the apparatus main body to the optional device to be entered by changing the power feed switch to the connected state, when the first connector and the second connector are coupled.

11 Claims, 6 Drawing Sheets

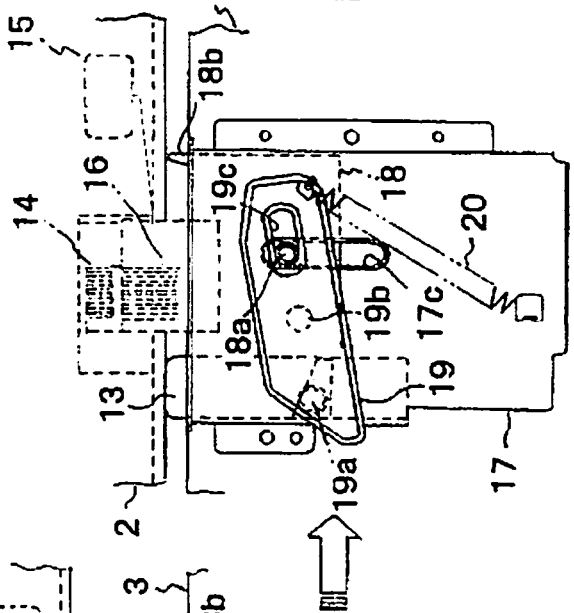
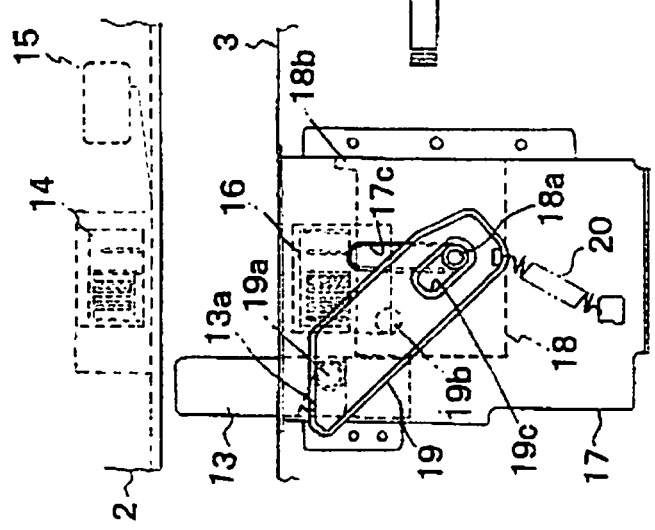
FIG. 4A  FIG. 4B  FIG. 4C

ELECTRICAL CONNECTING MECHANISM, IMAGE FORMING APPARATUS AND OPTIONAL DEVICE

This application is based on and claims the benefit of priority from Japanese Patent Application No. 2010-081621, filed on 31 Mar. 2010, the content of which is incorporated herein by reference.

BACKGROUND OF THE INVENTION

1. Field of the Invention

The present invention relates to an electrical connecting mechanism between an apparatus main body of an image forming apparatus or the like and an optional device, when using the optional device by mounting to the apparatus main body. In addition, the present invention relates to an image forming apparatus having an electrical connecting structure. Furthermore, the present invention relates to an optional device that can be electrically connected by mounting to an image forming apparatus main body.

2. Related Art

Among image forming apparatuses such as copying machines and printers that form an image on paper by xerography, there are those in which a paper feeder is added on as an optional device to the image forming apparatus main body. In this case, although the image forming apparatus main body is positioned and placed on the paper feeder, it is necessary to electrically connect both in order to supply power from the image forming apparatus main body side to the paper feeder side that was added on.

Conventionally, the setup of optional devices such as a paper feeder has often been performed by a specializing serviceman, and the electrical connection between the optional device and the image forming apparatus main body has been performed exclusively using electrical wires.

However, in recent years, there has been an increasing trend of users performing the setup of optional devices. As a result, the electrical connection between the optional device and the image forming apparatus main body has been performed using drawer connectors, which completely do not require wiring by electrical wires.

In a case of using drawer connectors in this way, there is an opportunity for the drawer connector to be damaged when the drawer connector of the optional device side is projecting, for example, by the image forming apparatus main body hitting the drawer connector when the user installs the image forming apparatus main body on the optional device.

Therefore, a configuration has been proposed in which the drawer connector stays inside the optional device standing alone (in a state without the image forming apparatus main body placed thereon), and when the image forming apparatus main body is installed thereon, the drawer connector projects to a connecting position by the linking of this operation, and is connected to the drawer connector of the image forming apparatus main body side.

According to the above proposed configuration, the problem of damage does not arises due to the drawer connector of the optional device side being sheltered when installing the image forming apparatus main body to the optional device.

However, in the above proposed configuration, there is a possibility of a malfunction occurring in that power is supplied from the image forming apparatus main body side to the optional device side even in a state in which the drawer connector of the image forming apparatus main body side and the drawer connector of the optional device side are incompletely connected.

SUMMARY OF THE INVENTION

An object of the present invention is to provide an electrical connecting mechanism that can suppress malfunction due to a poor connection between the drawer connectors of the apparatus main body side and the optional device side from occurring.

In addition, another object of the present invention is to provide an image forming apparatus having the above-mentioned electrical connecting mechanism.

Furthermore, another object of the present invention is to provide an optional device that mounts to an image forming apparatus main body and can be configured with the above-mentioned electrical connecting mechanism.

According to a first aspect of the present invention, an electrical connecting mechanism includes: a first connector disposed at an apparatus main body;

a second connector disposed at an optional device;

a power feed switch disposed in one among the apparatus main body and the optional device and capable of switching between a connected state and an unconnected state; and an operation element that is disposed in the other one among the apparatus main body and the optional device, and causes a state in which power can be supplied from the apparatus main body to the optional device to be entered by changing the power feed switch to the connected state, when the first connector and the second connector are coupled accompanying the optional device being mounted to the apparatus main body.

According to a second aspect of the present invention, an image forming apparatus includes: an image forming apparatus main body;

an option device detachably mounted to the image forming apparatus main body; and an electrical connecting mechanism having: a first connector disposed at the image forming apparatus main body, a second connector disposed at the optional device, a power feed switch disposed in one among the image forming apparatus main body and the optional device and capable of switching between a connected state and an unconnected state, and an operation element that is disposed in the other one among the image forming apparatus main body and the optional device, and causes a state in which power can be supplied from the apparatus main body to the optional device to be entered by changing the power feed switch to the connected state, when the first connector and the second connector are coupled.

According to a third aspect of the present invention, in an optional device equipped to an imaging forming apparatus main body having a first connector and a power feed switch capable of switching between a connected state and an unconnected state, the optional device includes:

a second connector; and an operation element that causes a state in which power can be supplied from the image forming apparatus main body to the optional device to be entered by changing the power feed switch to the connected state, when the first connector and the second connector are coupled accompanying mounting the optional device to the image forming apparatus main body.

BRIEF DESCRIPTION OF THE DRAWINGS

FIG. 4A is an explanatory view for operations of an electrical connecting mechanism according to the present invention;

FIG. 4B is an explanatory view for operations of the electrical connecting mechanism according to the present invention;

FIG. 4C is an explanatory view for operations of the electrical connecting mechanism according to the present invention;

DETAILED DESCRIPTION OF THE INVENTION

Embodiments of the present invention will be explained hereinafter based on the attached drawings.

Figure 1:
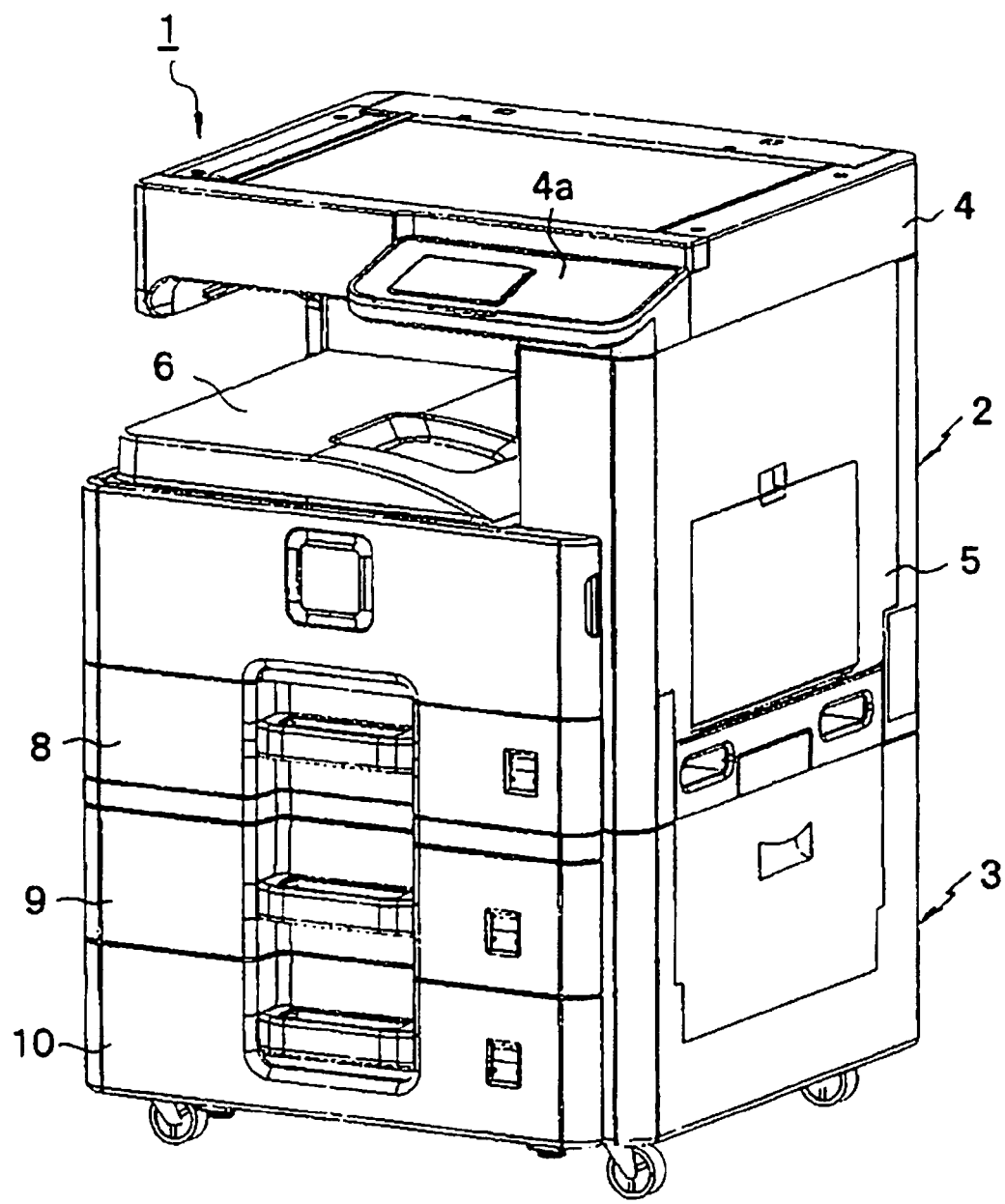
FIG. 1 is a perspective view of an image forming apparatus according to the present invention.
Figure 2:
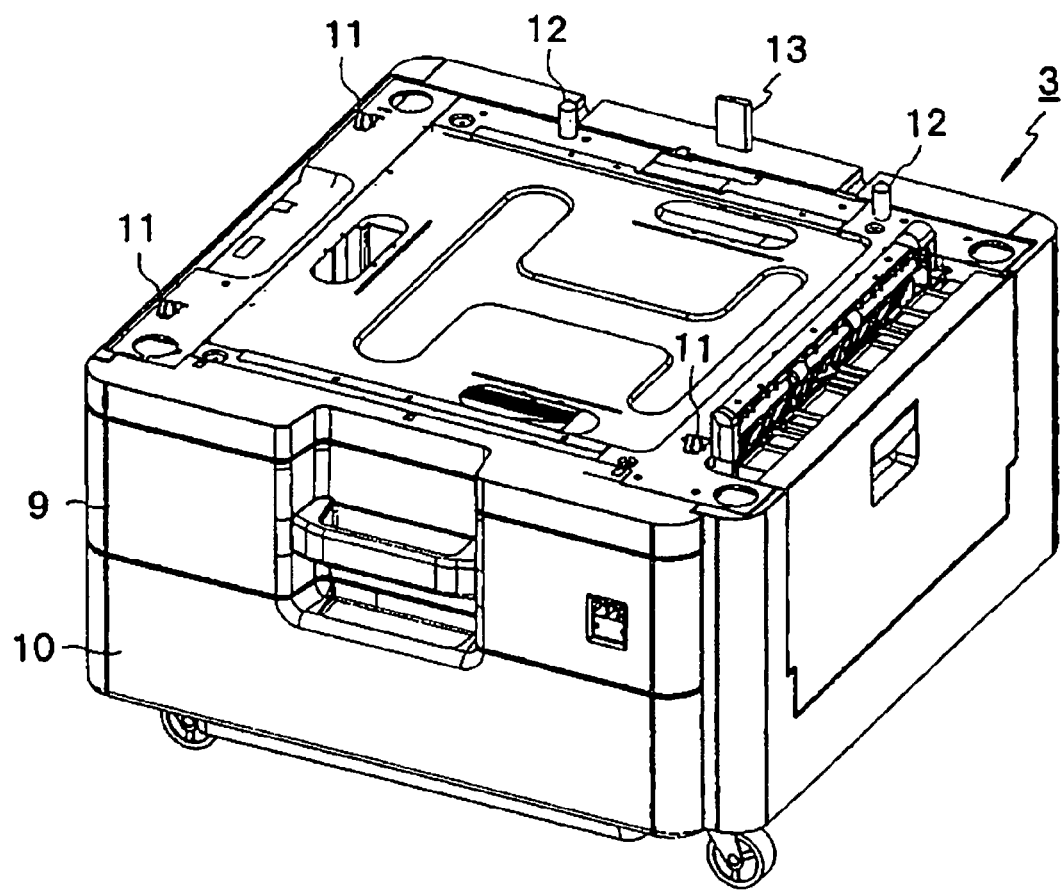
FIG. 2 is a perspective view of a paper feeder as an optional device.
Figure 3B:
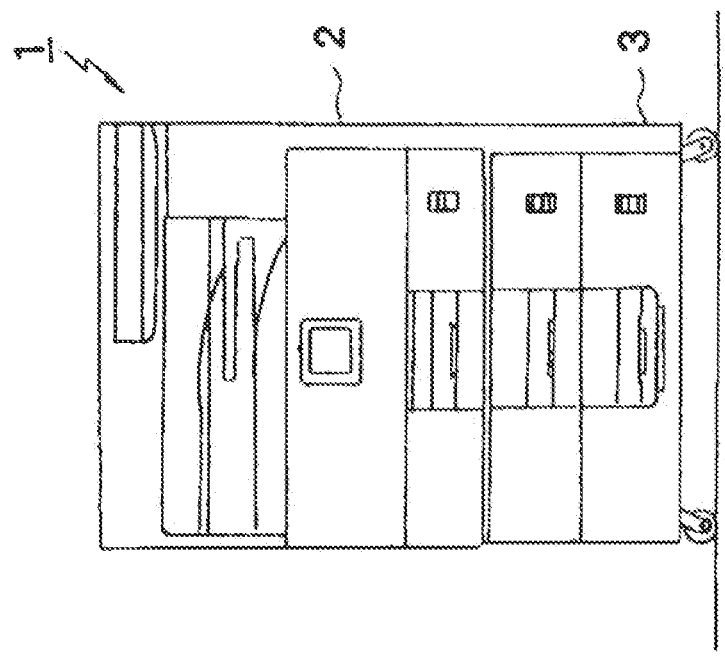
FIG. 3B is a front view illustrating a sequence of installing an image forming apparatus main body onto a paper feeder.
Figure 3A:
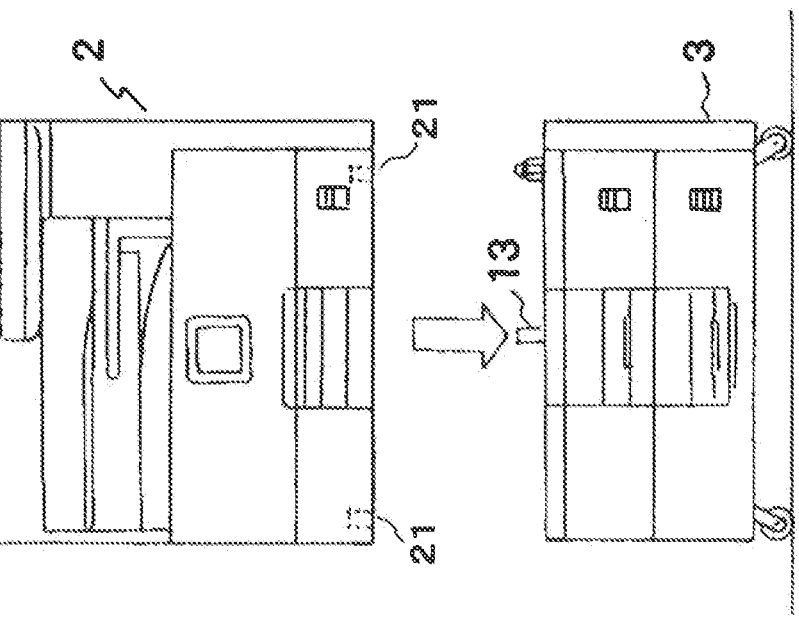
FIG. 3A is a front view illustrating a sequence of installing an image forming apparatus main body onto a paper feeder.
Figure 5:
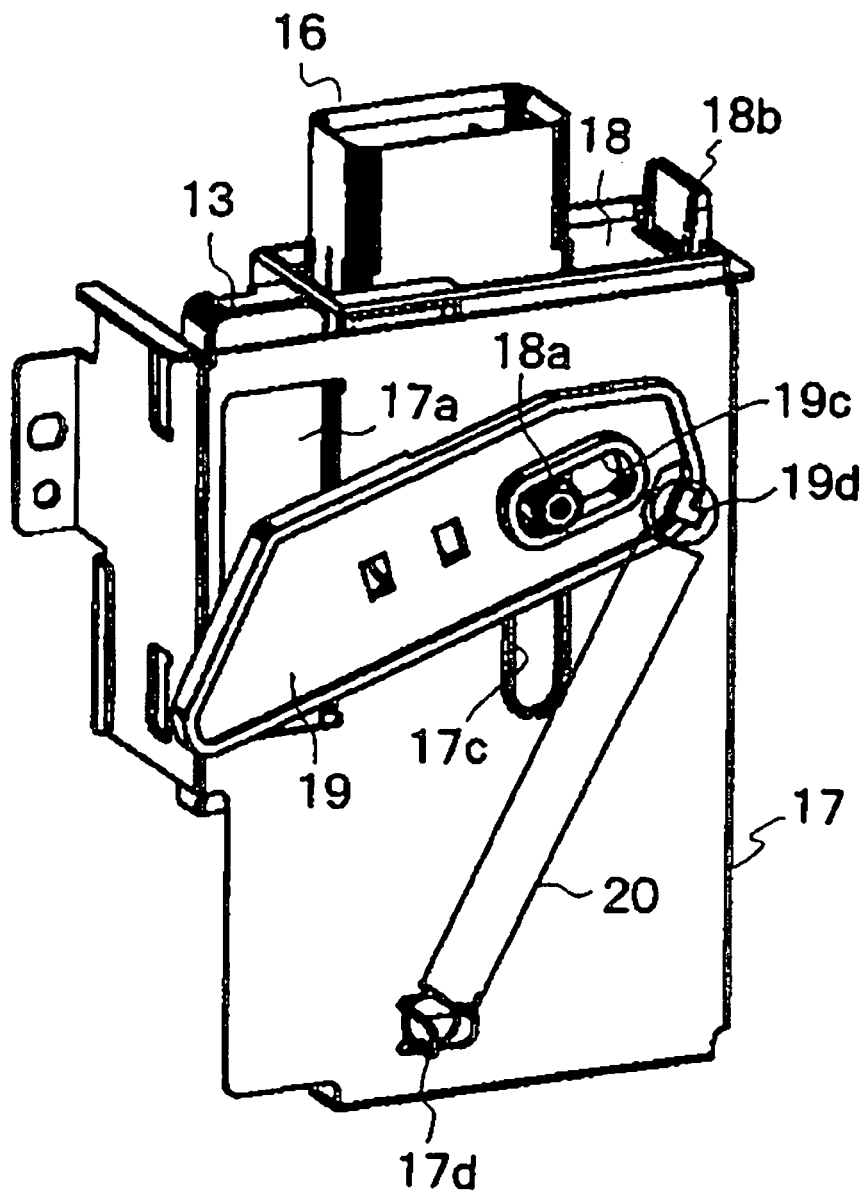
FIG. 5 is a perspective view of a drawer connector movement mechanism part of the electrical connecting mechanism according to the present invention.
Figure 6:
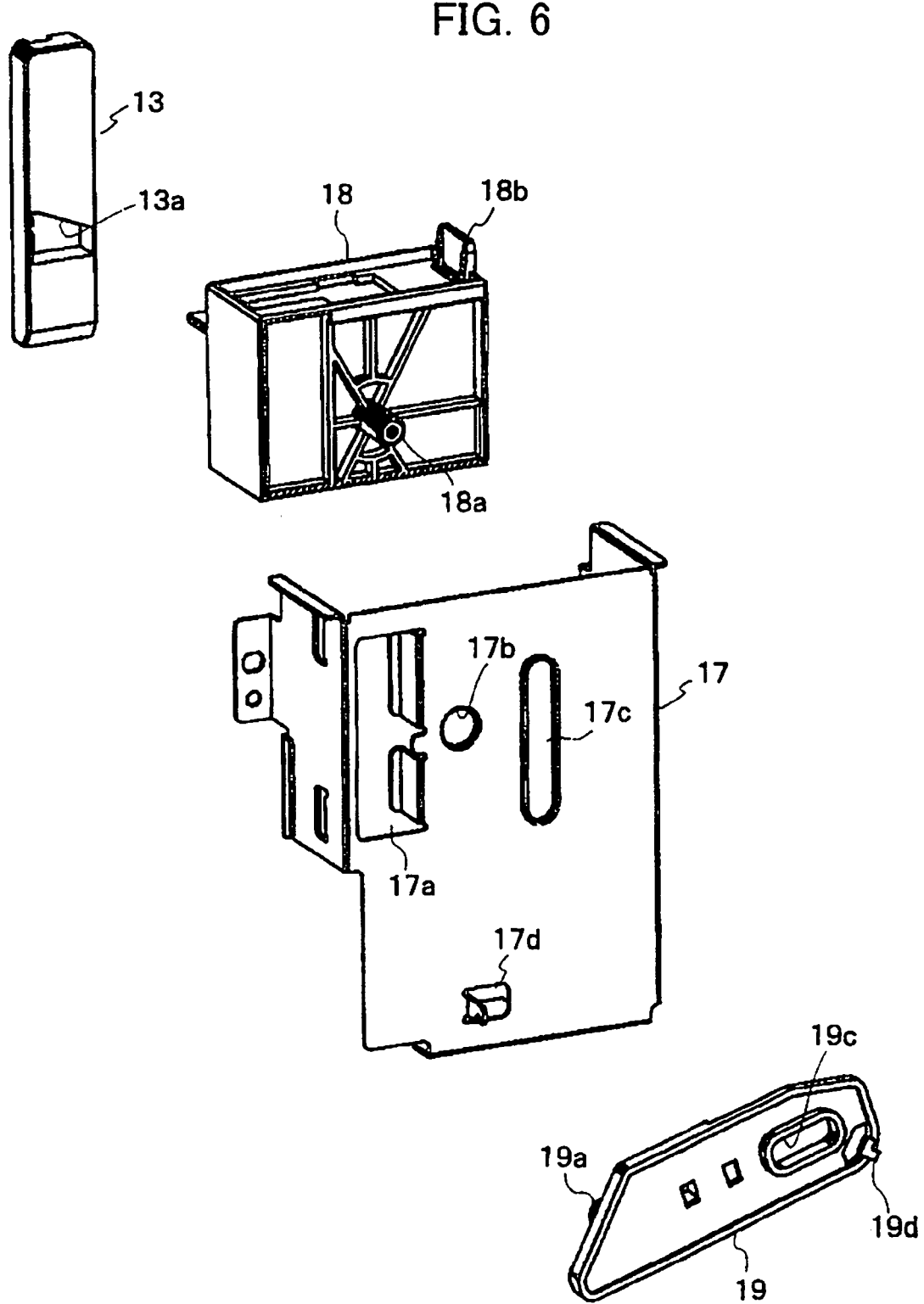
FIG. 6 is an exploded perspective view of a drawer connector movement mechanism part of the electrical connecting mechanism according to the present invention.

FIG. 1 is a perspective view of an image forming apparatus according to the present invention. FIG. 2 is a perspective view of a paper feeder, which is an optional device. FIG. 3A is a front view illustrating a sequence of installing the image forming apparatus main body onto the paper feeder. FIG. 3B is a front view illustrating a sequence of installing the image forming apparatus main body onto the paper feeder. FIG. 4A is an explanatory view for operations of an electrical connecting mechanism according to the present invention. FIG. 4B is an explanatory view for operations of the electrical connecting mechanism according to the present invention. FIG. 4C is an explanatory view for operations of the electrical connecting mechanism according to the present invention. FIG. 5 is a perspective view of a drawer connector movement mechanism part of the electrical connecting mechanism according to the present invention. FIG. 6 is an exploded perspective view of the drawer connector movement mechanism part of the electrical connecting mechanism according to the present invention.

The image forming apparatus 1 shown in FIG. 1 is a multifunction peripheral (MFP) equipped with a copying function, printer function and facsimile function. The image forming apparatus 1 is configured by an image forming apparatus main body 2 and a paper feeder (PF) 3, which is an optional device. The paper feeder 3 is installed on a floor surface, and the image forming apparatus main body 2 is installed to be stacked on the paper feeder 3.

An image reading device 4 is disposed on top of the image forming apparatus main body 2 in the vertical direction. An image forming portion 5 is disposed in the image forming apparatus main body 2 below the image reading device 4 in the vertical direction. Various process equipment that is not illustrated, such as photoreceptor drums, charging units, an optical scanning device such as a laser beam scanner (LSU), a developing device, a transfer device, a fusing device, and cleaning devices, are housed in the image forming portion 5.

In addition, an operational display portion 4a is provided on the front side of the image reading device 4. Furthermore, a receiving tray 6 is formed between the image reading device 4 and the image forming portion 5.

Then, two levels of upper and lower paper feeding cassettes 8, which can be pulled out to the front side of FIG. 1, are provided to the image forming portion 5. Several sheets of paper are stored in each of the paper feeding cassettes 8, respectively.

On the other hand, the paper feeder 3 has two levels of an upper and lower paper feeding cassette 9 and 10, which can be pulled out to the front side (in FIGS. 1 and 2), provided thereto, as shown in FIG. 2. Several sheets of paper are stored in each of the paper feeding cassettes 9 and 10.

Then, locking pawls 11 (only 3 illustrated in FIG. 2) are provided at each of the four corners on a top surface of this paper feeder 3, which is a surface on which the image forming apparatus main body 2 is placed. In addition, positioning pins 12 and 12 are provided to be standing on the left and right of the top surface at the back side in FIG. 2. A vertically movable main body detection lever 13, which configures a portion of the electrical connecting mechanism according to the present invention, projects vertically between these positioning pins 12.

It should be noted that positioning holes 21 and 21 into which the positioning pins 12 and 12 are inserted are formed at locations on the bottom surface of the image forming apparatus main body 2 corresponding to the positioning pins 12 and 12.

Herein, the configuration of the electrical connecting mechanism according to the present invention will be explained hereinafter based on FIGS. 4A to 6.

As shown in FIGS. 4A to 4C, a drawer connector 14 and a power feed switch 15 are fixedly installed to a bottom portion of the image forming apparatus main body 2. The power feed switch 15 is disposed on a side of the image forming apparatus main body 2 opposing the paper feeder 3.

This drawer connector 14 and power feed switch 15 are housed inside of the image forming apparatus main body 2, and do not project from the bottom surface of the image forming apparatus main body 2.

In contrast, the drawer connector 16 (second connector) supported to be vertically movable is provided to the paper feeder 3, as shown in FIGS. 4A to 4C. The drawer connector 16 is disposed on a side of the paper feeder 3 opposing the image forming apparatus main body 2. This drawer connector 16 stays inside of the paper feeder 3 and does not project from the top surface of the paper feeder 3 as shown in FIG. 4A in a state prior to the image forming apparatus main body 2 being installed on the paper feeder 3 (stand-alone state shown in FIGS. 2 and 3A).

Then, the drawer connector 16 is configured so as to move to the side of the image forming apparatus main body 2 when causing the image forming apparatus main body 2 and the paper feeder 3 to couple. When the image forming apparatus main body 2 is placed on the paper feeder 3 and set as shown in FIG. 3B, the drawer connector 16 rises up to a connecting position by way of the drawer connector movement mechanism part which operates in tandem with this operation (shown in FIGS. 4A to 6). Then, the drawer connector 16 projects from the top surface of the paper feeder 3 as shown in FIG. 4B, and connects to the drawer connector 14 (first connector) of the image forming apparatus main body 2 side.

In the present embodiment, after the drawer connector 14 and the drawer connector 16 are connected together as described above, i.e. after all of the connector pins provided to this drawer connector 14 and drawer connector 16, respectively, are reliably electrically coupled, the image forming apparatus 1 makes power supply from the image forming apparatus main body 2 side to the paper feeder 3 side possible by using a final downward stroke of the image forming apparatus main body 2 to set the power feed switch 15 to an ON state, as shown in FIG. 4C.

Herein, the configuration and operations of the drawer connector movable mechanism part for causing the drawer connector 16 of the paper feeder 3 side to rise up to the connecting position in tandem with an installation operation of the image forming apparatus main body 2 will be explained.

A housing 17 of a rectangular box shape having a top and bottom that are penetrated (opened) is mounted to the center in the width direction of a rear face of the paper feeder 3 in FIGS. 1 and 2. The main body detection lever 13 and a slider 18 of a rectangular block shape are each retained to be stored inside of this housing 17 to be vertically movable. The slider 18 is configured so as to move to the image forming apparatus main body 2 side when causing the image forming apparatus main body 2 and the paper feeder 3 to couple.

As shown in FIG. 6, a rectangular window 17a and circular hole 17b, elongated hole 17c that is long in the vertical direction, and a locking pawl 17d are formed in the above-mentioned housing 17.

An engaging hole 13a of a horizontal trapezoidal shape is formed in the main body detection lever 13.

A pin boss 18a that penetrates the elongated hole 17c of the housing 17 is integrally established (provided) to project in the front face of the slider 18. In addition, an operation element 18b of a protruding shape that presses the power feed switch 15 provided to the image forming apparatus main body 2 side and causes this to turn ON is integrally established (provided) to be standing at an end of the slider 18 on a top surface. The drawer connector 16 and the operation element 18b are disposed at the slider 18.

In addition, a link 19 is rotatably disposed at the exterior of the housing 17. A pin 19a is established to project at an end of this link 19, a pivot shaft 19b (refer to FIG. 4) is established (provided) to project in a middle portion thereof, and an elongated hole 19c and locking pawl 19d are formed at the other end thereof. Then, this link 19 is rotatably supported about the pivot shaft 19b to the housing 17 by the pivot shaft 19b formed therein being inserted and retained in the circular hole 17b formed in the housing 17.

Furthermore, the pin 19a formed in the link 19 is disposed inside of the housing 17 by penetrating the rectangular window 17a formed in the housing 17, and is disposed to be engaged with the engaging hole 13a of the main body detection lever 13 retained to be housed inside of the housing 17 to be vertically movable.

In addition, the pin boss 18a of the slider 18 retained to be stored inside of this housing 17 to be vertically movable projects to outside of the housing by penetrating the elongated hole 17c of the housing 17, and the projecting part thereof is disposed to be engaged with the elongated hole 19c formed in the link 19.

Then, the link 19 is biased in a clockwise direction (direction upwardly biasing the main body detection lever 13) in FIG. 4 about the pivot shaft 19b by a spring 20 having both ends locked to the locking pawl 19d formed thereto and the locking pawl 17d formed in the housing 17, respectively.

Furthermore, in a state prior to the image forming apparatus main body 2 being placed on the paper feeder 3, as shown in FIGS. 3A and 4A, the link 19 pushes up the main body detection lever 13 by being biased by the spring 20 as previously described, a result of which the main body detection lever 13 is maintained in a state vertically projected from the top surface of the paper feeder 3.

When the image forming apparatus main body 2 is moved downward from the above-mentioned state by causing a positioning hole that is not illustrated formed in the bottom surface of the image forming apparatus main body 2 to engage the positioning pin 12 of the paper feeder 3 side, the bottom surface of the image forming apparatus main body 2 abuts (touches) the main body detection lever 13 of the paper feeder 3 side and pushes this down against the resilience of the spring 20. The link 19 is thereby pivoted in the counter-clockwise direction as shown in FIG. 4B about the pivot shaft 19b.

When this is done, the slider 18 of which the pin boss 18a engages in the elongated hole 19c of the link 19 rises inside of the housing 17. The drawer connector 16 mounted to the slider 18 thereby projects upward from the top surface of the paper feeder 3 by rising up to the connecting position, and is connected to the drawer connector 14 of the image forming apparatus main body 2 side.

Then, after connector pins of the drawer connector 14 and the drawer connector 16 have reliably coupled by the image forming apparatus main body 2 being completely placed on the paper feeder 3, as shown in FIGS. 3B and 4C, when the slider 18 ascends (rises) due to the final stroke of the image forming apparatus main body 2 finally descending, the operation element 18b provided to the slider 18 presses the power feed switch 15 provided on the image forming apparatus main body 2 side and makes this enter the ON state.

In other words, when the drawer connector 14 and the drawer connector 16 are coupled, the operation element 18b presses the power feed switch 15 and causes it to enter the ON state in which power can be supplied from the image forming apparatus main body 2 to the paper feeder 3.

In addition, the operation element 18b moves to the power feed switch 15 side accompanying movement of the drawer connector 16, and presses the power feed switch 15 when the drawer connector 14 and the drawer connector 16 are coupled, thereby causing it to enter the ON state in which electrical power can be supplied from the image forming apparatus main body 2 to the paper feeder 3.

Furthermore, in a case of causing the image forming apparatus main body 2 and the paper feeder 3 to couple, after the drawer connector 14 and the drawer connector 16 have coupled, the operation element 18b is configured so as to further move by a predetermined distance and press the power feed switch 15.

Power supply from the image forming apparatus main body 2 side to the paper feeder 3 side thereby becomes possible. In addition, when the image forming apparatus main body 2 is completely placed on the paper feeder 3 and is set as shown in FIG. 3B, the four locking pawls 11 (refer to FIG. 2) projecting at the top surface of the paper feeder 3 are engaged with the positioning holes, which are not illustrated, formed in the bottom surface of the image forming apparatus main body 2. The image forming apparatus main body 2 and the paper feeder 3 are thereby integrally coupled.

Herein, in a state in which the image forming apparatus main body 2 and the paper feeder 3 are coupled, the operation element 18b of the present embodiment presses (continually presses) the power feed switch 15 to maintain the ON state. Then, in a case of the coupling between the image forming apparatus main body 2 and the paper feeder 3 being released, the operation element 18b releases the pressing of the power feed switch 15 in a state in which the drawer connector 14 and the drawer connector 16 are coupled, whereby the power feed switch 15 is made to switch from the ON state to an OFF state in which power cannot be supplied from the image forming apparatus main body 2 to the paper feeder 3. In other words, the coupling between the drawer connector 14 and the drawer connector 16 is released after the power feed switch 15 has entered the OFF state.

In the above way, the image forming apparatus 1 of the present embodiment is configured such that the power feed switch 15 does not turn ON unless the image forming apparatus main body 2 is installed on the paper feeder 3 and the drawer connector 14 and the drawer connector 16 are reliably connected. A high degree of safety is guaranteed in the image forming apparatus 1, without power being supplied from the image forming apparatus main body 2 to the paper feeder 3 in a state in which the connection between the drawer connector 14 and the drawer connector 16 is incomplete.

In addition, the drawer connector 16 of the paper feeder 3 side stays inside of the paper feeder 3 and does not project from the top surface in a state prior to the image forming apparatus main body 2 being installed thereon. The drawer connector 16 is connected to the drawer connector 14 of the image forming apparatus main body 2 side by moving to the connection position in tandem with the installation operation of the image forming apparatus main body 2, without being damaged when installing the image forming apparatus main body 2 on the top surface of the paper feeder 3.

Although a mode of equipping an optional device below an image forming apparatus main body has been explained above, the present invention can be applied also to an optional device such as a paper feeding device equipped on a side surface of the image forming apparatus main body or a post-processing device.

It should be noted that, although a mode of applying the present invention to a multifunction printer has been explained above, the present invention naturally can be similarly applied also to any other image forming apparatus such as a photocopying machine or printer as a single unit or other electronic equipment.

What is claimed is:

1. An electrical connecting mechanism, comprising:
    a first electric connector disposed at an apparatus main body;
    a second electric connector disposed at an optional device;
    a positioning pin disposed in one of the apparatus main body and the optional device and a positioning hole disposed in the other one thereof;
    a power feed switch disposed at a side of the apparatus main body opposing the optional device and capable of switching between a connected state and an unconnected state; and
    an operation element disposed at the optional device, and configured to cause the power feed switch to be in the connected state such that power is supplied from the apparatus main body to the optional device, when the first connector and the second connector are electrically coupled to each other through the positioning pin and the positioning hole to guide the optional device to be mounted to the apparatus main body,
    wherein the second connector is disposed at a side of the optional device opposing the apparatus main body and attached reciprocally movable with respect to the optional device, the second connector moving towards the side of the apparatus main body when mounting the optional device to the apparatus main body, and
    wherein the operation element is attached reciprocally movable with respect to the optional device in unison with movement of the second connector.

2. The electrical connecting mechanism according to claim 1,
    wherein the operation element further moves by a predetermined distance after the first connector and the second connector are coupled, when the optional device is mounted to the apparatus main body, and
    makes the power feed switch enter the connected state.

3. The electrical connecting mechanism according to claim 2,
    wherein the operation element makes the power feed switch enter the connected state and maintains the state in which power can be supplied, in a state in which the optional device has been mounted to the apparatus main body, and
    in a case of the optional device being removed from the apparatus main body, makes the power feed switch enter the unconnected state, in a state in which the first connector and the second connector are coupled, and causes a state in which power cannot be supplied from the apparatus main body to the optional device to be entered from the state in which power can be supplied.

4. The electrical connecting mechanism according to claim 1, further comprising a slider member configured to be attached reciprocally movable with respect to the optional device and to move toward a side of the apparatus main body when mounting the optional device to the apparatus main body,
    wherein the second connector and the operation element are disposed at the slider member.

5. An image forming apparatus, comprising:
    an image forming apparatus main body;
    an option device detachably mounted to the image forming apparatus main body; and
    an electrical connecting mechanism including:
    a first connector disposed at the image forming apparatus main body,
    a second connector disposed at the optional device,
    a positioning pin disposed in one of the image forming apparatus main body and the optional device and a positioning hole disposed in the other one thereof;
    a power feed switch disposed at a side of the image forming apparatus main body opposing the optional device and capable of switching between a connected state and an unconnected state,
    an operation element that is disposed at the optional device, and
    a slider member, at which the second connector and the operation element are disposed, configured to move toward a side of the image forming apparatus main body when mounting the optional device to the image forming apparatus main body,
    wherein the second connector is disposed at a side of the optional device opposing the image forming apparatus main body and moves toward the side of the image forming apparatus main body when mounting the optional device to the image forming apparatus main body, and
    wherein the operation element is configured to move toward a side of the power feed switch accompanying movement of the second connector so as to cause the power feed switch to be in the connected state such that power is supplied from the image forming apparatus main body to the optional device, when the first connector and the second connector are electrically coupled to each other through the positioning pin and the positioning hole to guide the optional device to be mounted to the image forming apparatus main body.

6. The image forming apparatus according to claim 5,
wherein the operation element further moves by a predetermined distance after the first connector and the second connector are coupled, when the optional device is mounted to the image forming apparatus main body, and makes the power feed switch enter the connected state.

7. The image forming apparatus according to claim 6,
wherein the operation element makes the power feed switch enter the connected state and maintains the state in which power can be supplied, in a state in which the optional device has been mounted to the image forming apparatus main body, and in a case of the optional device being removed from the image forming apparatus main body, makes the power feed switch enter the unconnected state, in a state in which the first connector and the second connector are coupled, and causes a state in which power cannot be supplied from the image forming apparatus main body to the optional device to be entered from the state in which power can be supplied.

8. An optional device equipped to an imaging forming apparatus main body having a first connector and a power feed switch capable of switching between a connected state and an unconnected state, the power feed switch being disposed at a side of the image forming apparatus main body opposing the optional device, the optional device comprising:

a second connector;

an operation element; and a slider member, at which the second connector and the operation element are disposed, configured to move toward the side of the image forming apparatus main body when mounting the optional device to the image forming apparatus main body, wherein the second connector is disposed at a side opposing the image forming apparatus main body and moves toward the side of the image forming apparatus main body when mounting the optional device to the image forming apparatus main body, wherein the operation element is configured to move toward a side of the power feed switch accompanying movement of the second connector so as to cause the power feed switch to be in the connected state such that power is supplied from the image forming apparatus main body to the optional device, when the first connector and the second connector are coupled to each other through a positioning pin disposed in one of the image forming apparatus main body and the optional device and a positioning hole disposed in the other one thereof to guide the optional device to be mounted to the image forming apparatus main body.

9. The optional device according to claim 8,
wherein the operation element further moves by a predetermined distance after the first connector and the second connector are coupled, when the optional device is mounted to the image forming apparatus main body, and makes the power feed switch enter the connected state.

10. The optional device according to claim 9,
wherein the operation element makes the power feed switch enter the connected state and maintains the state in which power can be supplied, in a state in which the optional device has been mounted to the image forming apparatus main body, and in a case of coupling between the optional device and the image forming apparatus main body being released, releases the connected state of the power feed switch in a state in which the first connector and the second connector are coupled, and causes a state in which power cannot be supplied from the image forming apparatus main body to the optional device to be entered from the state in which power can be supplied.

11. An optional device equipped to an imaging forming apparatus main body having a first connector and a power feed switch capable of switching between a connected state and an unconnected state, the power feed switch being disposed at a side of the image forming apparatus main body opposing the optional device, the optional device comprising:

a second connector; and an operation element, wherein the second connector is disposed at a side opposing the image forming apparatus main body and moves toward the side of the image forming apparatus main body when mounting the optional device to the image forming apparatus main body, wherein the operation element is configured to move toward a side of the power feed switch accompanying movement of the second connector so as to cause the power feed switch to be in the connected state such that power is supplied from the image forming apparatus main body to the optional device, when the first connector and the second connector are coupled to each other, wherein a positioner for regulating a mounting position of the optional device is provided to the image forming apparatus main body, wherein an engager for engaging the positioning means when mounting to the image forming apparatus main body is provided in the optional device, and wherein the second connector is disposed so as to move toward the image forming apparatus main body after the engager engages the positioner.

* * * * *